Dec. 13, 1949  F. P. ALLES ET AL  2,491,023
PHOTOGRAPHIC FILM ELEMENTS
Filed Sept. 12, 1945

Fig. 1.

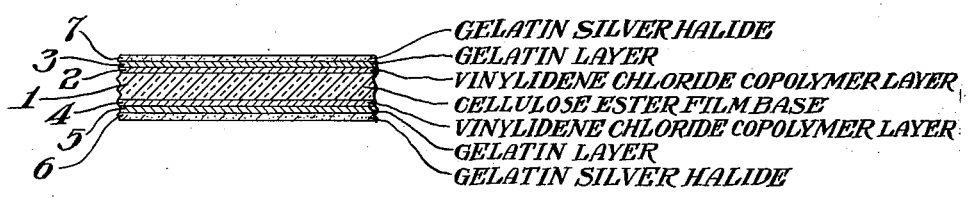

- GELATIN SILVER HALIDE
- GELATIN LAYER
- VINYLIDENE CHLORIDE COPOLYMER LAYER
- CELLULOSE ESTER FILM BASE
- VINYLIDENE CHLORIDE COPOLYMER LAYER
- GELATIN LAYER
- GELATIN SILVER HALIDE

Fig. 2.

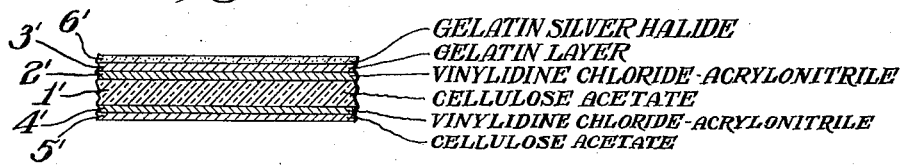

- GELATIN SILVER HALIDE
- GELATIN LAYER
- VINYLIDINE CHLORIDE-ACRYLONITRILE
- CELLULOSE ACETATE
- VINYLIDINE CHLORIDE-ACRYLONITRILE
- CELLULOSE ACETATE

INVENTORS
FRANCIS PETER ALLES
WILLIAM RUSSELL SANER
BY
Lynn Barratt Morris
ATTORNEY Patented Dec. 13, 1949

2,491,023

UNITED STATES PATENT OFFICE 2,491,023

PHOTOGRAPHIC FILM ELEMENTS

Francis Peter Alles, Westfield, and William Russell Saner, North Plainfield, N. J., assignors to E. I. du Pont de Nemours & Company, Wilmington, Del., a corporation of Delaware Application September 12, 1945, Serial No. 615,724

10 Claims. (Cl. 95—9)

This invention pertains to photographic film elements and more particularly to transparent multilayer photographic films which have good dimensional stability. Still more particularly the invention pertains to such elements which have a water insoluble cellulose derivative film base, a synthetic polymer sublayer, a gelatin sublayer, and at least one colloid-silver halide emulsion layer thereon.

Photographic film elements are known which consist of a cellulose derivative film base which has a thin substratum coating composed of nitrocellulose or an equivalent plastic material, such as a synthetic resin, directly imposed thereon, a gelatin substratum and a gelatino-silver halide emulsion layer. Various types of synthetic polymers and resins which are soluble in water or substantially insensitive thereto have been proposed for such films. The proposed types include partially hydrolyzed or completely hydrolyzed vinyl resins (United States Patent 1,921,326), polyvinyl esters, e. g., polyvinyl acetate, polyvinyl acetals (United States Patent 2,036,092), condensation products of formaldehyde with aromatic sulfonamides, the condensation products of polyhydric alcohols, e. g., glycols and glycerol with polybasic carboxylic acids and polybasic carboxylic acid compounds, e. g., phthalic acid and phthalic anhydride, urea formaldehyde resins and modified phenolformaldehyde resins.

The film elements just described vary somewhat in properties due to the difference in the physical properties of the various resins or polymers used in the substratum coatings but have the common characteristic that they have poor moisture-proofing properties. While the flexibility of such multilayer films is generally improved by the use of the aforesaid resins, etc., in some cases the dimensional stability of the composite film is impaired.

An object of the invention of the present application is to provide transparent multilayer photographic film elements which have a high degree of dimensional stability. A further object is to provide such elements which have a low degree of distortion after processing to a finished positive or negative photograph. A still further object is to provide such elements which have good clarity being free from haze. Another object is to provide such elements which have good adhesion between the film base and each of the layers so that the photographic layers are permanently anchored to the film base. Still other objects will be apparent from the present specification.

The above objects are accomplished in accordance with this invention by applying to a film base composed of a cellulose derivative a thin substratum coating composed of a copolymer of vinylidene chloride with a polymerizable vinyl compound containing at least 50% of the first-mentioned component. On the substratum coating there may be applied an anchoring substratum, e. g., a thin gelatin sublayer and finally there is applied a colloid-silver halide layer or a plurality of such layers, anti-halation layers, etc.

To be more specific, elements of the type just described can advantageously be prepared by applying to a cellulose derivative film base, e. g., cellulose acetate, a solution of the aforesaid copolymers in a volatile organic solvent, such as acetone, methyl ethyl ketone, and drying the same. An organic solvent dispersion of gelatin and an acid may then be coated on the latter layer as a sublayer. A colloid-silver halide dispersion, e. g. a gelatino-silver halide emulsion, is then coated onto the resulting thin gelatin sublayer. A plurality of differentially sensitized gelatino-silver halide emulsion layers can be similarly applied, if desired, to make a multilayer film element for color photography. These emulsion layers may contain in addition to sensitizing dyes to modify their spectral sensitivity, various types of color formers, etc. The film base may be treated on both sides in the manner just described.

The polymers utilized in accordance with the invention may be composed of vinylidene chloride or may be copolymers of vinylidene chloride with a polymerizable vinyl or vinylidene compound having a single vinyl group $CH_2=C=$. Suitable compounds are represented by the general formula:

where R is hydrogen, an alkyl, e. g. methyl, radical or a halogen, e. g. Cl, Br, and F, and X is a hydrocarbon radical, e. g. methyl, phenyl, or naphthyl or a negative group, e. g., halogen, such as chlorine, bromine and fluorine, $-NO$, $-NO_2$, $-CN$, $-COOH$, $-SO_3H$, $-CONH_2$, $-CONHR'$, $-CONR'_2$,

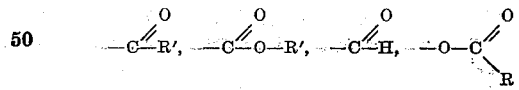

and ether radicals, e. g., $-OR''$; wherein R and R' is an alkyl radical and R'' is an alkyl or aryl radical.

There are various known ways of making the polymers including the aforedescribed copolymers which contain at least 50% by weight of vinylidene chloride. Suitable methods are described in United States Patents 2,160,903 and 2,160,931 to 2,160,943 inclusive, 2,160,945, 2,160,946 and 2,160,947. In making the copolymers there may be used such materials as vinyl acetate, vinyl propionate, vinyl chloroacetate, vinyl chloride, vinyl bromide; methyl or butyl acrylates; methyl, isobutyl, methoxyethyl, chloroethyl, or 2-nitro-2-methyl-propyl methacrylates; methyl or octyl alpha-chloroacrylates; methyl vinyl ketone, methyl isopropenyl ketone; acrylonitrile, methacrylonitrile; styrene, isobutylene; vinyl naphthalene; ethyl vinyl ether, butyl vinyl ether; N-vinyl phthalimide, N-vinyl succinimide, N-vinyl carbazole; methylene diethyl malonate, and the like or mixtures of two or more of these compounds.

The properties of the polymers, of course, vary somewhat by reason of the specific nature of the polymerizable vinyl compound. Thus some of the materials introduce solubilizing groups and others are relatively neutral. However, the proportions of reactants should be chosen and the polymerization carried out to such an extent that a layer 0.1 mil in thickness shall confer adequate moisture proofing characteristics to the cellulose derivative film base on which it is coated. The thickness of the layer is not limited to 0.1 mil but may be less than that, e. g., 0.05 mil, with some copolymers. Moreover, it may be 1 mil or more, if desired.

A test for satisfactory moisture proofing is as follows: A cellulose derivative film base approximately 0.007 inch in thickness is coated with a vlatile solvent solution of the polymer on each side to a thickness of 0.1 mil. It is dried to a constant weight, then immersed in water for one hour, and the surface is blotted to remove excess water or moisture and then weighed. If the gain in weight is less than 100 milligrams per square decimeter per 0.1 mil thickness per hour at 25° C., the polymer is satisfactory.

It has been found that copolymers of vinylidene chloride and acyrlonitrile containing from 50 to 95% by weight of the former are eminently well suited as a substratum coating in the novel multilayer film elements of this invention.

The coating solutions in general should have a solids content of 2 to 10% by weight and have a viscosity suitable for flowing, brushing, spraying or spreading.

The coating can be applied on a commercial scale by using the standard equipment used in the manufacture of photographic film. It has been found to be advantageous to apply the polymer or copolymer to one side of the film base and to apply a thin gelatin sublayer to the copolymer layer before treating the other side of the base with a layer of the copolymer Or a gelatin layer may be applied to one side and a substantially non-thermoplastic resin or cellulose derivative applied to the other side. In the case of a film element having a light-sensitive coating on each side of the base, a gelatin substratum may be applied to each copolymer layer. The gelatin sublayer when so applied prevents the polymer from sticking to the guiding and drying rollers during drying and further coating operations. The gelatino-silver halide layers may be applied soon after the gelatin sublayers have been dried or they may be applied at some later date.

The polymer and gelatin sublayers may be deposited on the film base or on the copolymer layer respectively by any of the usual coating methods used in the manufacture of photographic elements, e. g., by immersion of the surfaces of the film into a solution of the coating material, spraying, beading, or coating from a hopper provided with a doctor blade, etc.

The invention will be further illustrated but is not intended to be limited by the following examples. The parts are by weight.

*Example I*

A solution of a vinylidene chloride-acrylonitrile copolymer wherein the components had a weight ratio of 80 to 20 was prepared by dissolving 5 parts of the copolymer in 95 parts of acetone. The resulting solution was permitted to stand at about 32° C. for about 17 hours to allow any insoluble material to settle out. The clear supernatant solution was then separated from the precipitant or insoluble portion and coated at a temperature of about 40° C. onto a cellulose acetate film base having a thickness of about 8 mils as shown schematically in Fig. 1 of the drawing to form a layer having a thickness of about 0.05 to 0.20 mil. A gelatin subbing solution was then prepared by admixing 1.2 parts of gelatin with 4.8 parts of acetic acid, 14.0 parts of methanol and 80 parts of acetone. This solution was coated at a temperature of 42° C. onto layer 2 to form a thin gelatin sublayer 3. The other side of the film base was successively coated in like manner with the copolymer and gelatin to form layers 4 and 5 having the same thickness as layer 2. After the layers were dried a gelatino-silver halide emulsion was successively coated onto each of the gelatin sublayers to form emulsion layers 6 and 7, respectively. After exposure and processing to a photographic image and drying, the film was free from surface distortion, and cockle, and sheets of the film lay perfectly flat without any tendency to curl at the edges. They did not readily respond to changes in relative humidity.

The film support consisting of the cellulose acetate film base and the thin layer of copolymer was tested to determine its swelling and shrinking properties before the gelatin substratum and gelatin silver halide emulsion were coated thereon. A sample of uncoated film base and polymer-coated film base was immersed for one hour in water at 24° C. The uncoated sample evidenced a swelling of 1.30% whereas the coated base was 0.10%. The shrinkage of the uncoated base was 0.20% as compared with 0.02% for the coated base.

*Example II*

A similar film element was made by coating cellulose acetate containing 55.6% combined acetic acid and having a thickness of 5 mils in like manner. The untreated film base had a swelling of 1.15% as compared with 0.25% for the coated base. The untreated base had a shrinkage of 0.30% as compared with 0.00% for the coated base.

*Example III*

A solution of a vinylidene chloride-acrylonitrile copolymer wherein the components had a weight ratio of 80 to 20 was prepared by dissolving 5 parts of the copolymer in 95 parts of methyl ethyl ketone. The clear solution was coated at a temperature of about 40° C. onto a cellulose triacetate film base containing 59.5% combined acetic acid having a thickness of about 5 mils. A gelatin subbing solution was then prepared by admixing 1.2 parts of gelatin, 0.2 part of salicylic acid, 14.0 parts of methanol, 4.6 parts of water and 80.0 parts of acetone. This solution was coated and dried at a temperature of about 50° C. onto the layer of copolymer to form a thin gelatin sublayer. The other side of the film base was successively coated in like manner with the copolymer solution and the gelatin solution to form two substrata. The gelatin layers after drying were each successively coated with a gelatino-silver chloride emulsion layer. The film element after exposure and photographic processing as described in Example I had the same properties as described therein. The copolymer subbed film base was tested for swelling and shrinking before the application of the gelatin layer. A sample of uncoated cellulose triacetate and the copolymer-coated cellulose triacetate were immersed in water at 24° C. for a period of 1 hour. The uncoated sample exhibited 1.30% swelling as compared with 0.13% swelling for the coated sample. The untreated film had a shrinkage of about 0.7% as compared with 0.02% for the coated sample.

Example IV

A solution of vinylidene chloride-acrylonitrile copolymer wherein the component had a weight ratio of 80 to 20 was prepared by dissolving 5 parts of the copolymer in 95 parts of acetone. The resulting solution was permitted to stand at about 32° C. for about 17 hours to allow any insoluble material to settle out. The clear supernatant solution was then separated from the precipitant or insoluble portion and coated at a temperature of about 40° C. onto a cellulose acetatebutyrate film to form a layer on each side thereof having a thickness of about 0.1 mil. A sample of the uncoated and coated film base was immersed in water at 24° C. for one hour. The uncoated film base had a swelling of 0.70% as compared with 0.25% for the coated base. The uncoated base had a shrinkage of 0.30% as compared with 0.01% for the coated base.

Each layer of copolymer was coated with a gelatin subbing solution of the type described in Example I to form thin sublayers. After drying, the layers were successively coated with a gelatino-silver chloride emulsion layer. The film was exposed to light, developed, fixed, washed and dried and had properties similar to that described in Example I.

Example V

A solution of a vinylidenechloride-acrylonitrile copolymer, wherein the components had a weight ratio of 80 to 20 was prepared by dissolving 5.25 parts of the copolymer in 95 parts of acetone. The resulting solution was permitted to stand at about 32° C. for approximately 17 hours to allow any insoluble material to settle out. The clear supernatant solution was then separated from the precipitant or insoluble portion and coated onto a cellulose acetate film base having a thickness of about 8 mils as shown schematically in Fig. 2 of the drawing and dried at about 57° C. to form a layer (layer 2') having a thickness of about 0.1 mil.

A gelatin subbing solution was then prepared by admixing 1.1 parts of gelatin with 4.0 parts of acetic acid, 21.8 parts of methanol and 73.1 parts of acetone. This solution was coated onto layer 2' and dried at a temperature of 57° C. to form a thin gelatin sublayer 3'. The other side of the base was coated successively with the copolymer and with a thin layer of cellulose acetate to form layers 4' and 5'. The cellulose acetate solutions were prepared by dissolving 0.25 part of cellulose acetate in 99.75 parts of acetone. Layer 4' had a thickness of approximately 0.1 mil. After the layers were dried, a gelatino-silver halide emulsion was coated onto layer 3' to form emulsion layer 6'.

A sample of the above film, together with a similar sample which had not been moisture-proofed with the copolymer were immersed for one hour in water at 25° C. The latter sample had a swelling of 1.14% and a shrinkage of 0.44% as compared with a swelling of 0.54% and a shrinkage of 0.02% for the moisture-proof film.

Example VI

A dispersion was prepared by admixing with three parts of an aqueous dispersion of vinylidenechloride-acrylonitrile copolymer containing 56% solids obtained from the Dow Chemical Company and designated as Experimental Latex X-122, Formulation EM-51-B, 9 parts of distilled water, 1 part of diacetone alcohol, 1 part of dimethoxytetraethylene glycol, 1 part of methyl ethyl ketone and 2 parts of a 10% solution of N-cetyl betaine in water. All parts are by volume. The milky-white dispersion was then coated onto a cellulose acetate film base having a thickness of about 8 mils, and dried at approximately 55° C. to give a clear layer having a thickness of 0.05 to 0.2 mil. A gelatin subbing solution, prepared as described under Example V, was coated onto the copolymer layer and dried at a temperature of about 55° C. The other side of the base was then coated successively with the copolymer dispersion and with the gelatin subbing solution. After the layers were dried, a gelatino-silver halide emulsion was coated over the gelatin subbing layers.

After processing and drying the above film, it was free from curl and cockle.

A sample of cellulose acetate film base, moisture-proofed on both sides with the above-described copolymer dispersion, together with an untreated sample of the same base were immersed for one hour in water at 25° C. The moisture-proofed sample had a swelling of 0.44% and a shrinkage of 0.01% as compared with a swelling of 1.25% and a shrinkage of 0.25% for the untreated film.

In formulating the copolymer dispersion other solvents or partial solvents for the vinylidenechloride-acrylonitrile copolymer and for cellulose acetate may be substituted for those mentioned in the above example. Proportions and combinations may be varied through a wide range without breaking the dispersion. Other wetting agents may likewise be employed.

In place of the ketones described in the above examples as solvents for the vinylidenechloride-acrylonitrile copolymer, there may be substituted other solvents therefor. Suitable additional solvents include methyl propyl ketone, methyl isobutyl ketone, and butyl acetate. The copolymers are also partly soluble in ethyl acetate and small amounts of this solvent can be used with those described above. In place of the specific polymers described in the examples, there may be substituted any of the copolymers described above. Thus, the following specific copolymers having the weight ratios indicated were found to give similar results when coated on film base in place of the specific copolymer of the above examples: vinylidene chloride/vinylacetate 70/30, vinylidene chloride/styrene 70/30, vinylidene chloride/methyl methacrylate 70/30, vinylidene chloride/acrylonitrile 70/30 and 90/10, vinylidene chloride/methacrylonitrile 60/40, vinylidene chloride/vinyl chloride 60/40 and 90/10, and vinylidene chloride/isobutylene 75/25.

The vinylidene chloride polymers are substantially insoluble in monohydric alcohols; e. g., methanol, ethanol, etc., methylene chloride, propylene chloride, trichloroethylene, toluene, methyl acetate, amyl acetate, and the monomethyl ether of ethylene glycol. These non-solvents, however, when admixed with the solvents just described can be used in the coated solution. For example, toluene is useful when admixed with solvents, e. g., methyl ethyl ketone.

Various types of subbing solutions can be used in place of those described above. Suitable additional solutions are:

|  | Per cent |
|---|---|
| Gelatin | 0.6 |
| Salicylic acid | 0.2 |
| Water | 1.0 |
| Methanol | 14.8 |
| Acetone | 83.4 | and

| Gelatin | 0.8 |
|---|---|
| Salicylic acid | 0.3 |
| Water | 1.0 |
| Methanol | 14.9 |
| Acetone | 83.0 |

In place of the gelatin in such subbing solutions there may be substituted other reversible film-forming organic colloids, capable of showing high viscosity characteristics and appreciable gelly strength. Suitable colloids of this type include glue, casein, albumen, polyvinyl alcohols, etc.

The invention is not limited to the particular light-sensitive silver halides described above. Thus the light-sensitive layers may be composed of simple or mixed silver halides dispersed in various types of water-permeable binding agents. Thus the coatings may contain silver chloride, silver bromide, silver-chlorobromide and silver-iodobromide in gelatin or equivalent water-permeable colloids.

The film base such as cellulose acetate, cellulose triacetate, ethyl cellulose, cellulose nitrate, cellulose nitroacetate, cellulose acetate propionate, cellulose acetate butyrate, cellulose propionate, cellulose butyrate can be coated on one or both sides with the novel moisture proofing substratum described above. An anti-halation layer, for example, may be coated on the other side.

Various emulsion components such as sensitizing dyes, desensitizing agents, fog inhibitors, emulsion stabilizers, color formers, light screening dyes and pigments may be present in such layers. Suitable color formers are described in United States Patents 2,154,918, 2,166,181, 2,179,228, 2,179,238, 2,179,239, 2,179,244, 2,140,540, 2,133,937, 2,200,924, and 2,189,817.

The superior and unexpected moistureproofing properties of the novel photographic films of this invention are quite evident from the following table:

| Coating | Water [1] Sorption, mg./dm.²/Hr. at 25° C. | Per cent Change in Length |
|---|---|---|
| Cellulose Acetate (C/A) Untreated | 139 | 1.28 |
| Cellulose Nitrate on C/A | 128 | 1.18 |
| Polyvinyl Acetate on C/A | 138 | 1.27 |
| Vinylidene Chloride-Acrylonitrile (80-20) on C/A | 21 | 0.19 |
| Vinylidene Chloride-Isobutylene (75-25) on C/A | 2 | 0.02 |
| Vinylidene Chloride-Vinyl Chloride (40-60) on C/A | 36 | 0.33 |
| Vinylidene Chloride-Vinyl Chloride (60-40) on C/A | 21 | 0.19 |

[1] These values may be expressed as: mg. (of water)/0.1 mil (thickness of resin coating on each side of the base)/hour (time of immersion in water)/dm.² (area) sorbed by 7 mils cellulose acetate (55.6 percent combined acetic acid) at 25° C.

The photographic films of this invention possess a number of advantages. They are in general characterized by possessing good strength, dimensional stability, good water resistance, and are non-inflammable.

The film elements in the form of cut sheets lie flat after photographic processing which is particularly advantageous.

A further advantage is that the light-sensitive layers are firmly anchored to the film base by means of the substratum and do not separate either in the wet or dry state. This is true even when the films are bent over a very sharp radius.

A still further advantage is that the film base is adequately moisture-proofed, which contributes excellent dimensional stability to the composite film element, without the necessity of resorting to waxes.

As many widely different embodiments of this invention can be made without departing from the spirit and scope thereof, it is to be understood that the invention is not to be limited except as defined by the claims.

What is claimed is:

1. A photographic element comprising a film base composed of a water-insoluble cellulose derivative taken from the class consisting of water-insoluble-cellulose acetate, -cellulose acetate propionate, and -cellulose acetate butyrate having coated thereon at least one thin layer composed of a vinylidene chloride polymer, containing at least 50% by weight of vinylidene chloride as a component of said polymer, and at least one water-permeable colloid-silver halide emulsion layer carried by said layer of polymer.

2. A photographic element comprising a film base composed of a water-insoluble cellulose derivative taken from the class consisting of water-insoluble-cellulose acetate, -cellulose acetate propionate, and -cellulose acetate butyrate having coated thereon at least one thin layer composed of a vinylidene chloride copolymer with a polymerizable vinyl compound containing at least 50% by weight of vinylidene chloride, a thin water-permeable colloid layer on said layer of copolymer and a colloid-silver halide emulsion coated on said polymer layer.

3. A photographic element comprising a film base composed of a water-insoluble cellulose derivative taken from the class consisting of water-insoluble-cellulose acetate, -cellulose acetate propionate, and -cellulose acetate butyrate having coated thereon at least one thin layer composed of a vinylidene chloride-acrylonitrile copolymer, at least one colloid-silver halide emulsion layer carried by said layer of copolymer.

4. A photographic element comprising a water-insoluble film base composed of a water-insoluble cellulose derivative taken from the class consisting of water-insoluble-cellulose acetate, -cellulose acetate propionate, and -cellulose acetate butyrate having coated thereon at least one thin sublayer composed of a vinylidene chloride-acrylonitrile copolymer, a thin water-permeable colloid layer on said layer of copolymer and a colloid-silver halide emulsion layer coated on said colloid layer.

5. A photographic element comprising a water-insoluble cellulose acetate film base having coated thereon at least one thin sublayer composed of a vinylidene chloride-acrylonitrile copolymer, a thin water-permeable colloid layer on said layer of copolymer and a colloid-silver halide emulsion layer coated on said colloid layer.

6. A photographic element comprising a water-insoluble cellulose acetate film base having coated on each side thereof, a thin layer composed of a vinylidene chloride-acrylonitrile copolymer, a thin water-permeable colloid layer on said layer of copolymer and a colloid-silver halide emulsion layer coated on said colloid layer.

7. A photographic element comprising a water-insoluble film base composed of a water-insoluble cellulose derivative taken from the class consisting of water-insoluble-cellulose acetate, -cellulose acetate propionate, and -cellulose acetate butyrate having coated on each side thereof, a thin layer composed of a vinylidene chloride copolymer with a polymerizable vinyl compound containing at least 50% by weight of vinylidene chloride, a thin gelatin sublayer on at least one of said layers of copolymer and a gelatino-silver halide emulsion layer on said gelatin sublayer.

8. A photographic element comprising a water insoluble cellulose acetate film base having coated on each side thereof a thin layer composed of a vinylidene chloride-acrylonitrile copolymer containing at least 50% by weight of vinylidene chloride, a thin gelatin sublayer on each layer of copolymer and a gelatino-silver halide emulsion layer on each gelatin sublayer.

9. A photographic element comprising a water insoluble cellulose acetate film base having coated on each side thereof a thin layer composed of a vinylidene chloride-isobutylene copolymer containing at least 50% by weight of vinylidene chloride, a thin gelatin sublayer on each layer of copolymer and a gelatino-silver halide emulsion layer on each gelatin sublayer.

10. An article of manufacture comprising a water insoluble cellulose acetate film base having coated on each side thereof a thin layer composed of a vinylidene chloride copolymer with a polymerizable vinyl compound containing at least 50% by weight of vinylidene chloride and a gelatin layer coated on at least one of said copolymer layers.

FRANCIS PETER ALLES.
WILLIAM RUSSELL SANER.

REFERENCES CITED

The following references are of record in the file of this patent:

UNITED STATES PATENTS

| Number | Name | Date |
|---|---|---|
| 1,627,935 | Stinchfield | May 10, 1927 |
| 2,074,647 | Hagedorn et al. | Mar. 23, 1937 |
| 2,133,110 | Nadeau | Oct. 11, 1938 |

OTHER REFERENCES

"Plastics Catalog," 1943, pp. 162–164; 1944 pp. 208–211, published by Plastics Catalog Corp., New York, N. Y.

Industrial and Engineering Chemistry, April 1943, pp. 422–428.